United States Patent
Chase (10) Patent No.: US 8,500,141 B2
(45) Date of Patent: Aug. 6, 2013

(54) PORTABLE SHOOTING RAIL

(76) Inventor: Stephen Chase, Middletown, NY (US)

( * ) Notice: Subject to any disclaimer, the term of this patent is extended or adjusted under 35 U.S.C. 154(b) by 617 days.

(21) Appl. No.: 12/650,688

(22) Filed: Dec. 31, 2009

(65) Prior Publication Data

US 2011/0156366 A1 Jun. 30, 2011

(51) Int. Cl.
*B62B 1/20* (2006.01)

(52) U.S. Cl.
USPC .................. 280/47.18; 280/47.3; 182/187

(58) Field of Classification Search
USPC ........ 280/47.131, 47.17, 47.18, 47.2, 47.315, 280/47.3, 47.31, 47.32; 182/187, 188, 20, 182/133, 136; 135/90, 901; 43/1
See application file for complete search history.

(56) References Cited

U.S. PATENT DOCUMENTS

| | | | | |
|---|---|---|---|---|
| 3,332,698 A * | 7/1967 | Cafra | | 280/655 |
| 3,358,789 A * | 12/1967 | Laun | | 182/113 |
| 4,130,180 A * | 12/1978 | Ferguson et al. | | 182/187 |
| 4,321,982 A * | 3/1982 | Strickland | | 182/20 |
| 4,582,165 A * | 4/1986 | Latini | | 182/20 |
| 5,282,520 A * | 2/1994 | Walker | | 182/116 |
| 5,295,556 A * | 3/1994 | Mullin | | 182/187 |
| 5,314,042 A * | 5/1994 | Adams | | 182/187 |
| 5,433,291 A * | 7/1995 | Shoestock, Sr. | | 182/20 |
| 5,669,403 A * | 9/1997 | Belcher et al. | | 135/90 |
| 5,740,882 A * | 4/1998 | Griffith et al. | | 182/20 |
| 5,887,676 A * | 3/1999 | Harbin | | 182/20 |
| 5,903,997 A * | 5/1999 | Jacob | | 43/1 |
| 6,243,979 B1 * | 6/2001 | Seats et al. | | 42/94 |
| 6,345,690 B1 * | 2/2002 | Morris | | 182/136 |
| 6,481,529 B1 * | 11/2002 | Voorhies | | 182/20 |
| 6,516,919 B1 * | 2/2003 | Sempel | | 182/20 |
| 6,588,440 B2 * | 7/2003 | Varnado | | 135/90 |
| 6,588,546 B1 * | 7/2003 | Forrest | | 182/135 |
| 7,051,908 B2 * | 5/2006 | Mignano | | 224/153 |
| 7,156,206 B2 * | 1/2007 | Prejean | | 182/136 |
| 7,182,091 B2 * | 2/2007 | Maddox | | 135/90 |
| 7,219,680 B1 * | 5/2007 | Gresock | | 135/90 |
| 7,533,761 B2 * | 5/2009 | Forrest | | 182/136 |
| 7,588,123 B2 * | 9/2009 | Woller et al. | | 182/136 |
| 7,849,964 B2 * | 12/2010 | Amacker et al. | | 182/136 |
| 7,958,968 B1 * | 6/2011 | Stabler | | 182/187 |
| 8,201,571 B1 * | 6/2012 | Smith | | 135/90 |
| 8,205,626 B2 * | 6/2012 | Myers | | 135/90 |
| 2002/0152665 A1 * | 10/2002 | Varnado | | 43/1 |
| 2003/0024559 A1 * | 2/2003 | Fields | | 135/90 |
| 2003/0178255 A1 * | 9/2003 | Auer | | 182/187 |
| 2006/0207831 A1 * | 9/2006 | Moore et al. | | 182/20 |
| 2007/0227818 A1 * | 10/2007 | Bedell | | 182/136 |
| 2007/0235259 A1 * | 10/2007 | Tolliver et al. | | 182/136 |
| 2007/0235261 A1 * | 10/2007 | Forrest | | 182/136 |
| 2012/0012142 A1 * | 1/2012 | Frady et al. | | 135/90 |
| 2012/0080268 A1 * | 4/2012 | Bedell | | 182/134 |

* cited by examiner

*Primary Examiner* — Katy M Ebner
*Assistant Examiner* — Emma K Frick
(74) *Attorney, Agent, or Firm* — Leason Ellis LLP (57) ABSTRACT

A portable shooting rail for use with a tree stand includes a rear frame assembly for engaging a tree. The rear frame assembly has a pair of spaced rear arms for engaging a tree and a pair of spaced forward arms and a vertical support portion that extends upwardly from the arms for placement against the tree. The vertical support member has a bottom cross bar and a top cross bar. The forward arms extend outwardly from the vertical support portion such that an obtuse angle is formed between the forward arms. A pair of struts connects the top cross bar to the forward arms. The shooting rail also includes a rail structure that is detachably coupled to the rear frame, with the rail structure being formed of separate rail sections that attach to one another and to the rear frame assembly to define a completed loop.

24 Claims, 7 Drawing Sheets fig. 1

PORTABLE SHOOTING RAIL

TECHNICAL FIELD

The present invention relates to game equipment and in particular, the present invention relates to a portable shooting rail that assists a hunter in aiming and discharging a firearm, especially when the hunter is in a tree stand.

BACKGROUND

Tree stands are commonly used by hunters, especially deer hunters. Tree stands are mounted at an elevated position within the tree and therefore, provide the hunter with a better, wider field of view and they also position the hunter out of the normal line of sight of game animals, such as deer. Many times tree stands are elaborate permanent or semi-permanent tree stands that are made up of a permanent frame with rails or arms surrounding an occupant. However, these tree stands are both costly and difficult to mount at an elevated position. Many times, a hunter will simply leave behind the stand after the hunting trip is over or after the hunting season has concluded.

An alternative to permanent stands is self climbing tree stands that permit the hunter to ratchet the stand upwardly as the hunter climbs the tree. However, this type of tree stand must be lowered when the hunter descends from the tree. Yet another type of tree stand is a lower tree stand platform that is lashed or chained to a tree and ladders or steps attached to the tree allow the hunter to ascend or descend at will without having to physically remove the tree stand. This type of stand can be fitted with a seat; however, due to their simplicity, these types of stands do not provide means for mounting a camouflage cover or partition to hide the hunter from the view. Moreover, not all of these types of include a shooting rail or rest to assist a hunter in aiming or discharging the firearm.

In addition, those hunting stands that do include a shooting rail often have dimensions that do not permit the hunter to comfortably occupy the stand and be in a position where the firearm can be accurately and comfortably supported. More specifically, the dimensions of the shooting stands are typically too small and as a result the occupant typically can only rest an elbow on the shooting rail as opposed to truly being able to fully support the firearm and the body of the hunter.

There is therefore a need to provide an improved portable shooting rail that can be used with any number of different types of tree stands, including permanent tree stands, etc. and permit a greater degree of movement by the occupant and also permits the occupant to be hidden from view when optional camouflage is used.

SUMMARY

In accordance with one embodiment, a portable shooting rail for use with a tree stand includes a rear frame assembly for engaging a tree. The rear frame assembly has a pair of spaced rear arms for engaging a tree and a pair of spaced forward arms and a vertical support portion that extends upwardly from the arms for placement against the tree. The forward arms extend outwardly from the vertical support portion such that an obtuse angle is formed therebetween since a distance between the forward arms increases in a direction toward distal ends of the forward arms. The shooting rail also includes a rail structure that is detachably coupled to the rear frame, the rail structure including a first arcuate rail part and a second arcuate rail part. The first rail part has a first end that is coupled to the distal end of one forward arm and an opposing second end. The second rail part has a first end coupled to the distal end of the other forward arm and an opposing second end that is coupled to the second end of the first rail part so are to form a complete rail structure that defines a shooting rail and defines an area in which the user can stand.

In another embodiment, a portable shooting rail for use with a tree stand includes a rear frame assembly for engaging a tree. The rear frame assembly has a pair of spaced rear arms for engaging a tree and a pair of spaced forward arms and a vertical support portion that extends upwardly from the arms for placement against the tree. The vertical support member has a bottom cross bar and a top cross bar. The forward arms extend outwardly from the vertical support portion such that an obtuse angle is formed between the forward arms. A pair of struts connects the top cross bar to the forward arms. The shooting rail also includes a rail structure that is detachably coupled to the rear frame, with the rail structure being formed of separate rail sections that attach to one another and to the rear frame assembly to define a completed loop.

These and other aspects, features and advantages shall be apparent from the accompanying Drawings and description of certain embodiments of the invention.

DETAILED DESCRIPTION OF CERTAIN EMBODIMENTS OF THE INVENTION

Figure 1:
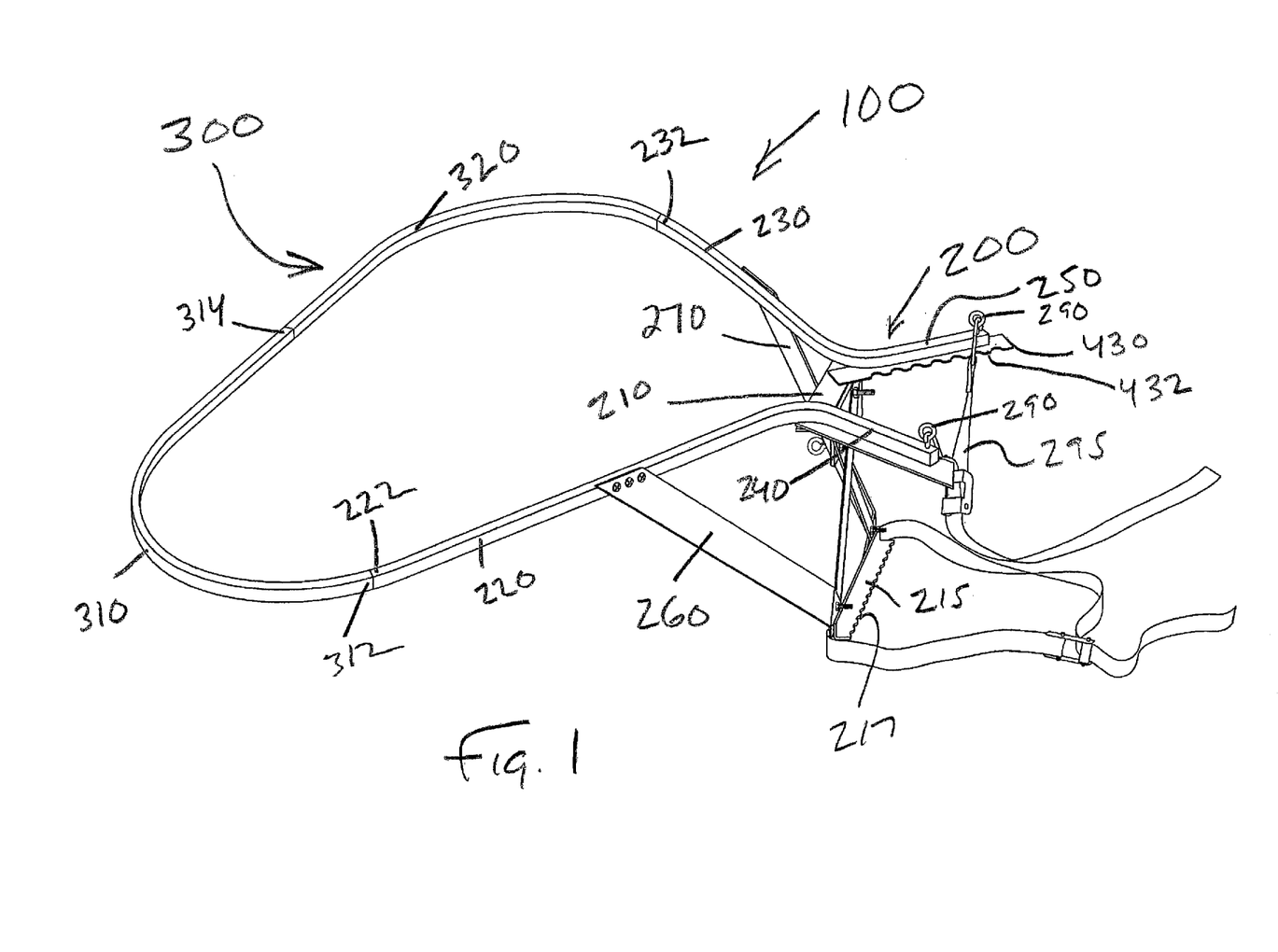
FIG. 1 is a side perspective view of a portable shooting rail according to the present invention.

FIG. 1 is a perspective view of a portable shooting rail 100 according to the present invention. The portable shooting rail 100 is formed of a number of different complementary components that detachably mate with one another to form the assembled shooting rail 100. For example, the portable shooting rail 100 can be formed of a rear support member or rear frame 200 and a plurality of shooting rail parts 300 that mate with one another to define an assembled shooting rail that surrounds the user (sportsman) when it is installed and coupled to a tree.

The shooting rail 100 is intended for use with any number of different types of tree stands, particularly, portable tree stands. As mentioned above, unlike permanent tree stands, portable tree stands are meant to be removed from the tree after the hunter's day is completed. Typically, portable tree stands provide a seat and limited platform on which the hunter can stand. Since portable tree stands are portable in nature, the seat and platform can not be too large so as to create excess weight.

As shown in FIGS. 1-6, the rear frame 200 includes a base plate 210 to which a pair of forward support arms 220, 230 and a pair of rear support arms 240, 250 are coupled. One exemplary base plate 210 is in the form of an L-shaped bracket that has a first surface 212 and a second surface 214 that is angled to the first surface 212 (e.g. perpendicular). The rear frame 200 includes a cross-support member 260 that is formed of a pair of support members 262, 264 that intersect one another. The cross-support members 262, 264 can be arranged to have an X-shape as illustrated (an X brace). First ends of the cross-support members 262, 264 are connected to the base plate 210 (i.e., the first surface 212 thereof). The rear frame 200 can also include a second plate 215 that can be in the form of a horizontal support member that extends across and above the base plate 210. The base plate 210 and second plate 215 are arranged in a substantially parallel manner and the length of the second plate 215 can be greater than a length of the base plate 210. Similar to the base plate 210, the second plate 215 can be in the form of a bracket or plate-like structure. Second ends of the cross-support members 262, 264 are connected to the second plate 215.

In one embodiment, forward support arm 220 and rear support arm 240 represent a single integral structure (e.g., a single molded component or a single forged metal component, etc.) and similarly, the forward support arm 230 and rear support arm 250 represent a single integral structure. The forward support arm 220 and rear support arm 240 can generally have a boomerang shape. When assembled, the openings of the arms 230, 250 and the arms 220, 240 face opposite one another.

The rear frame 200 also includes a pair of vertical support members (struts) 260, 270 that extend between the forward support arms 220, 230 and second ends of the cross-support members 262, 264. The vertical support members 260, 270 are attached to the upper plate 215 and to the forward support arms 220, 230. The rear support arms 240, 250 extend behind (to the rear) of the rear frame 200, while the forward support arms 220, 230 extend forward of the rear frame 200.

The components that make up the rear frame 200 can be formed of metal and any number of conventional techniques can be used for coupling the individual parts of the rear frame 200 to one another. For example, the individual components can be welded to one another using conventional welding techniques or other forms of mechanical attachment can be used, such as using fasteners (e.g., rivets) for attaching one part to another part.

The rear frame 200 also includes a pair of coupling members 290 to assist in coupling the rear frame 200 to a supporting object, in this case the tree trunk. For example, the coupling members 290 can be in the form of a pair of eyelets 290 that are disposed at the location of the plate 210 or plate 215 depending upon the orientation. For example, the eyelets 290 can be located where the vertical support members 260, 270 are joined to the upper plate 215. The eyelets 290 face forward relative to the rear frame 200. The eyelets 290 are configured to receive a securing member 295 that engages the tree and in particular, the securing member 295 can be in the form of a securing strap that has a first end and an opposing second end with each end has its own coupling member for detachable engagement to the rear frame 200. For example, the coupling member can be in the form of an S hook where a first end of the S-hook is securely attached to one end of the strap, while the other end of the S-hook engages the opening in the eyelet 290. However, other attachment mechanisms including The engagement of the S-hook to the eyelet 290 is of a detachable nature since the entire shooting rail 100 is portable and therefore, the individual components thereof can be detached from one another for ease of storage and transportation. The strap 295 can be formed of any number of suitable synthetic materials, including but not limited to nylon, etc.

The strap is of an adjustable type in that it includes a buckle or winch or the like that permits the length of the strap 295 to be adjusted so as to accommodate different sized trees.

In one embodiment, the rear frame 200 also includes tree engaging stabilizing members 420 that are designed to intimately engage the trunk of the tree to assist in securely attaching and locating the shooting rail 100 relative to the tree. For example, the tree engaging stabilizing members 420 can be in the form of a pair of plates 430 that have teeth 432 formed along an inner edge thereof. The plates 430 can be mounted to the upper surfaces of the rear support arms 240, 250 and an underside of the base plate 210. When the rear frame 200 engages the trunk of the tree, the teeth 432 bite into the trunk of the tree for stabilizing and fixing the shooting rail 100 relative to the tree. The teeth 432 on the two inner edges of the plates 430 face one another and therefore, the rear frame 200 is anchored to two opposing sides of the tree.

Alternatively, the rear support arms 240, 250 can include the tree engaging stabilizing members and in this case, teeth can be formed along the inner edges of the rear support arms 240, 250.

When the rear frame 200 is mounted to the tree, the strap 400 extends circumferentially about the tree at a location generally above the rear frame 200. The weight of the forward components of the rear frame 200 causes the rear frame 200 to naturally tilt forward when mounted to the tree and thus, the strap 400 serves to limit the tilting of the rear frame 200 and serves to retain the shooting rail 100 to the tree.

It will also be understood that the rear frame 200 that is shown is merely one exemplary structure that provides support for the other components of the shooting rail 100 and permits the shooting rail 100 to be a portable structure. In other words, the rear frame 200 can have another construction so long as it can perform the intended application and functions to not only be coupled/mounted to the tree in a substantially fixed position while at the same time providing a support structure for holding the other components of the shooting rail 100.

The rear frame 200 serves as a support for the plurality of shooting rail parts 300 that mate with one another to define an assembled shooting rail that surrounds the user (sportsman) when it is installed and coupled to a tree. The shooting rail parts 300 are configured to mate with one another to form a perimeter shooting rail that extends from the rear frame 200 and formed a wide enclosure in which the occupant can stand and move to a desired shooting position.

In the illustrated embodiment, the shooting rail parts 300 are made up of a first shooting rail part 310 and a second shooting rail part 320. The shooting rail parts 310, 320 are configured to mate with one another and to mate with the rear frame 200. The shooting rail part 310 includes a first end 312 and an opposing second end 314. The first end 312 includes a first end connector 316 and the second end 314 includes a second end connector 318. Similarly, the shooting rail part 320 includes a first end 322 and an opposing second end 324. The first end 322 includes a first end connector 326 and the second end 324 includes a second end connector 328.

The forward support arm 220 has a distal end 222 that represents a first connector 224 for coupling to the shooting rail parts 300 as discussed herein. Similarly, the forward support arm 230 has a distal end 232 that represents a second connector 234 for coupling to the shooting rail parts 310, 320. In particular, the first end connector 316 mates with the first connector 224 of the forward support arm 220. The second end connector 318 mates with the second end connector 328 of the shooting rail part 320 and similarly, the first end connector 326 mates with the second connector 234 of the forward support arm 230 to thereby assemble the shooting rail parts 300 to the rear frame 200.

It will be understood that the first end connector 316 can be a male or female connector, while the first connector 224 of the forward support arm 220 has the opposite type connector to allow mating therebetween. For example, the first end connector 316 can be a sleeved portion, while the first connector 224 of the forward support arm 220 can be an unsleeved portion. Similarly, the second end connector 318 can be a male or female connector that is of a type that is opposite the connector type of the first end connector 316. The first end connector 326 and second end connector 328 can also be male or female type connectors that are configured to mate with complementary connectors. For example, the second end connector 318 can be a sleeved portion which maters with an unsleeved portion second end connector 328 of the rail 320. The first end connector 326 can be a sleeved portion that mates with an unsleeved portion that represents the second connector 234 of the forward support arm 230.

In the illustrated embodiment, the shooting rail part 310 and shooting rail part 320 have an arcuate shape and in particular, the parts 310, 320 are curved parts. It will be appreciated that when the shooting rail parts 310, 320 are attached to the forward support arms 220, 230 of the rear frame 200, an endless loop is formed. The loop defines the shooting rail on which the firearm is rested and in contrast to conventional designs, the loop is wide enough that the hunter has great latitude in terms of movement within the loop. For example, at a widest point, the loop has a width of about 45 inches.

The individual components that form the rear frame or brace 200 and the shooting rail 300 can be formed of a number of different robust materials, including different metals that provide sufficient weight bearing capabilities. For example, the parts can be aluminum tubing or aluminum plates (e.g., ¾" to ⅞" aluminum tubing).

It will be appreciated that the shooting rail 100 of the present invention is easy to set up and transport and is configured to be used with modern portable tree stands. The rear frame or brace 200 serves as a load bearing, stabilizing structure and allowing the rail parts 310, 320 to form a loop that extend outwardly from the rear frame 200 and therefore, introduces a mass that is located a spaced distance from the tree and therefore generates a downward force. The strap 295 serves to counter the force created by the shooting rails parts 310, 320 since the strap 400 is first located at the top of the rear frame 200 and the strap 295 extends rearwardly therefrom, opposite to the shooting rail parts 310, 320 that are mounted to the bottom of the rear frame 200 and extend forward to the rear frame 200. The force thus applied to the top of the rear frame 200 counters the force generated at the bottom of the rear frame 200. The result is that the shooting rail 100 remains stabilized and is securely held in place in the tree.

Figures 2A, 2B:
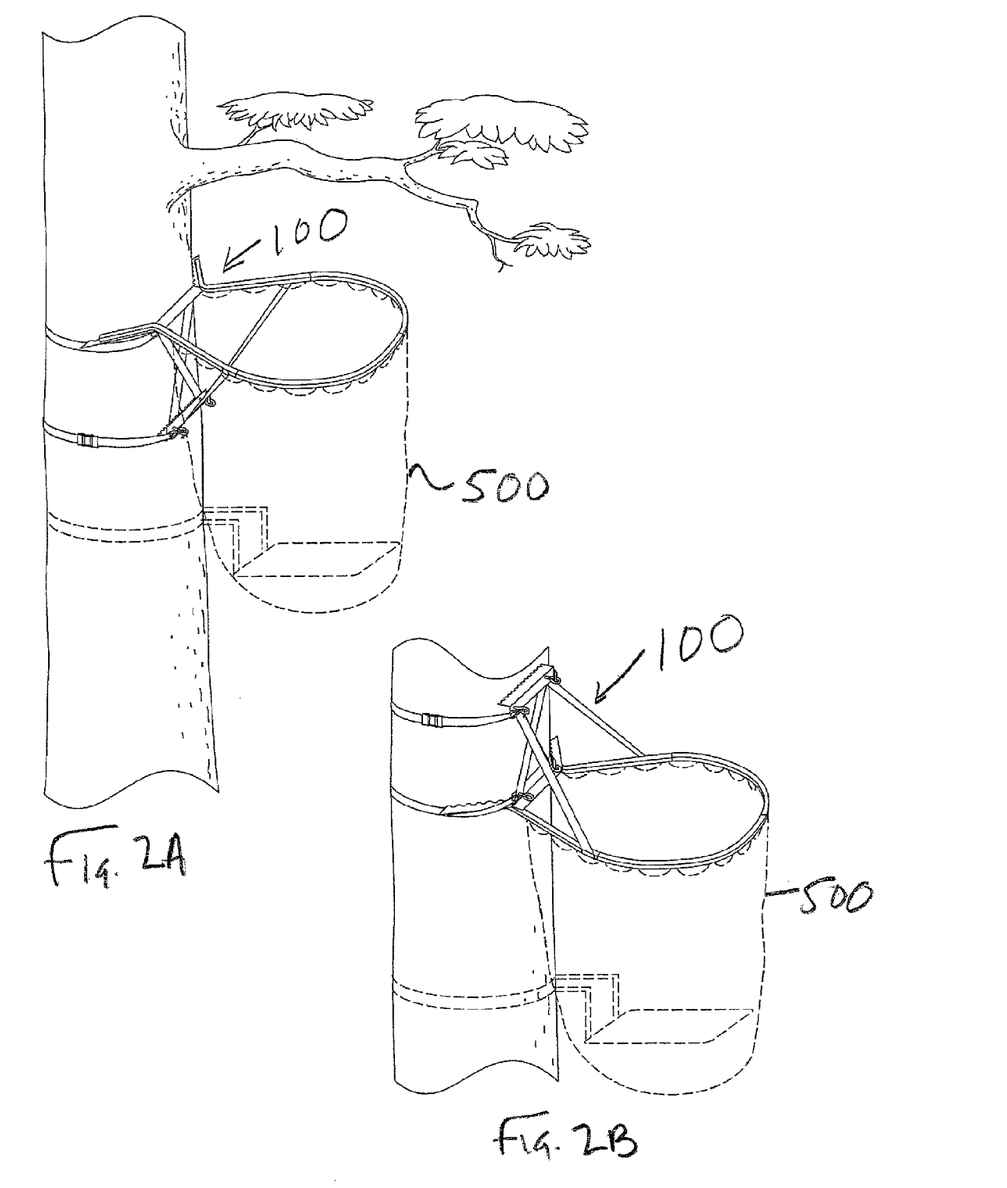
FIG. 2A is a perspective view of the portable shooting rail of FIG. 1 in a first orientation installed in a tree.
FIG. 2B is a perspective view of the portable shooting rail of FIG. 1 in a second orientation installed in a tree.

It will also be appreciated that the shooting rail 100 shown in FIG. 1 can be inverted in that the base plate 210 is the top part of the frame and the shooting rail (loop) 300 is located above the rear frame 200. The plate 215 represents the bottom plate in this arrangement. In this arrangement, the weight of the shooting rail (loop) 300 (in the direction toward the ground) causes the rear frame 200 to pivot against the tree. The above arrangement generates a retaining force of the shooting rail since the mass of the shooting rail 300 causes a force to be generated toward the tree causing the teeth of the rear frame to engage and dig into the tree. FIGS. 2A and 2B show the two different orientations.

Figure 7:
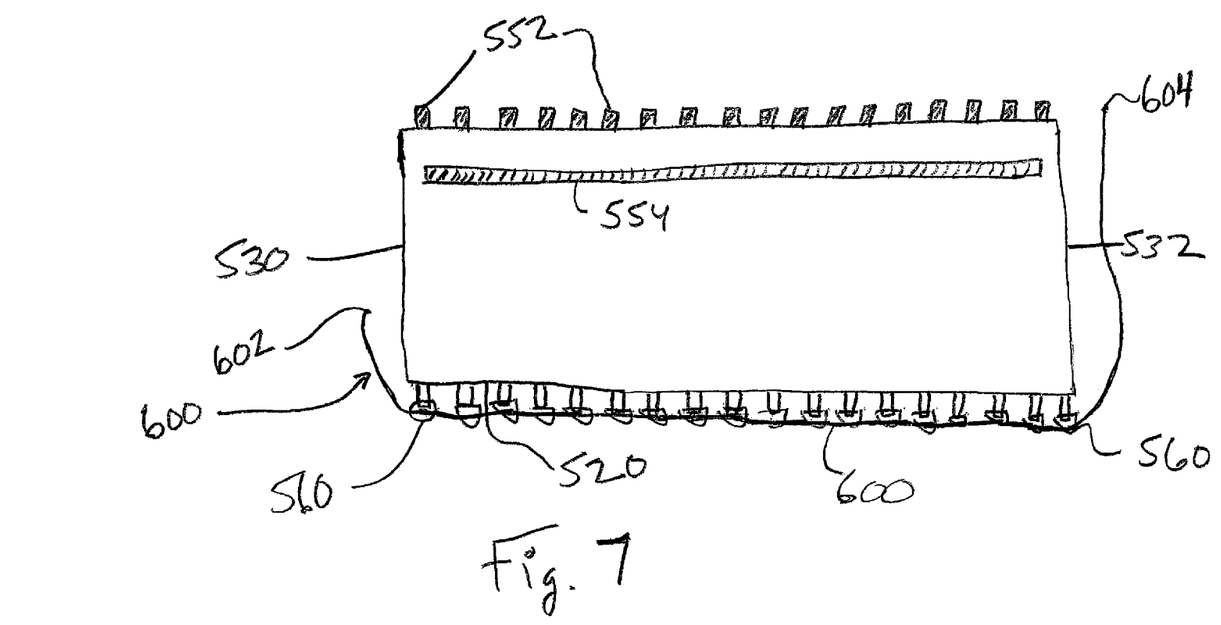
FIG. 7 is a front elevation view of a net or curtain for use with the shooting rail of the present invention.

In yet another embodiment, the shooting rail 100 is configured so that is can be easily outfitted with a camouflage structure that obscures and hides the hunter's movement from the target and also blocks scent distribution. For example, FIGS. 2A, 2B and 7 show a camouflage structure in the form of a camouflage blind or curtain 500 that can be easily attached to the shooting rail 100. The camouflage curtain 500 includes a top edge 510, a bottom edge 520 and a pair of opposing ends 530, 532. The curtain 500 has a complementary shape to the shooting rail 100 to allow it to be draped relative thereto.

The top edge 510 includes first coupling members that allow the top edge 510 to be securely attached to the shooting rail parts 310, 320. For example, the top edge 510 can include a plurality of top fasteners 550 that extend along a length thereof to permit spaced points or locations of the top edge 510 to be securely attached to the rail parts 310, 320. The fasteners 550 can comprise first fastening members 552 attached to the top edge 510 and one or more complementary second fastening member 554 that is spaced from the member 552 to allow the top edge 510 to be folded over the rail parts 310, 320 and attached to itself due to the fastening engagement of the first fastening members 552 and the second fastening members 554. The first fastening members 552 can be in the form of a plurality of straps formed of hook and loop material that have one end attached to the top edge 510 and extend outwardly therefrom (e.g., extend perpendicular therefrom). The second fastening members 554 are in the form of one or more segments (e.g., a horizontal band) of hook and loop material that is attached to an outer surface of the curtain 500 and spaced from the top edge 510. When the strap 552 are intimately attached to the band 554, the top edge 510 is folded over itself with the rails 310, 320 being captured between the band 554 and the top edge 510.

Since the curtain 500 is flexible, it can easily be routed along the curved rails 310, 320. When installed, the top edge 510 of the curtain 500 is about waist high.

The curtain 500 can also include a cinching mechanism to cause a cinching action along the bottom edge 520. For example, along the bottom edge 520, a plurality of coupling and routing members 560 are provided and are located at spaced intervals across the bottom edge 520. The routing members 560 permit a flexible elongated member 600, such as a cable or the like, to be routed therethrough. For example, members 560 can be in the form of straps that contain D-rings at the ends thereof. Each D-ring includes an opening through which the elongated member can be inserted for routing and locating the elongated member 600 along the bottom edge 520. The D-rings can be plastic parts.

The two top corners of the curtain 500 located at the ends of the top edge 510 also contain coupling and routing members for receiving and routing the elongated member 600. For example, the coupling and routing members can be similar or identical to the members 560 or they can be different. They can be in the form of a pair of rings attached to the top corners of the curtain 500. The routing members can also be associated with the shooting rail itself in that the routing members can be eye hooks or the like that can extend outwardly from the shooting rail and permit the elongated member 600 to be routed therethrough and thereby permits the elongated member 600 to be coupled to the shooting rail.

The elongated member 600 can be in the form of a cable or heavy wire or cord that has a first end 602 and an opposing second end 604. In one embodiment, the member 600 is a polypropylene cord. The cable 600 is routed such that the cable 600 is routed through all of the members 560 and thereby extends along the ends 530, 532 and bottom edge 520 and at least partially along the top edge 510. It is along the top edge 510 where the two ends 602, 604 of the cable 600 meet. In particular, the two ends 602, 604 can be coupled to one another (e.g., tied, etc.).

The elongated member 600 can also be attached at one end to the tree and then is routed through the members 560 along the bottom edge 520 before passing through a routing member that is associated with the shooting rail or can be associated with the tree. By pulling the elongated member 600 through this routing member, the elongated member 600 can be gathered along its bottom edge 520 below the stand/platform which supports the hunter.

The cinching mechanism works by simply pulling the two free ends 602, 604 of the cable 600 thereby causing the curtain 500 to gather along the bottom edge 520 of the curtain 500. For example, the user can drape the curtain 500 over the rail parts 310, 320 and then pull on the ends 602, 604 to cause a cinching action along the bottom edge 520 and thereby create a taunt curtain 500 that obscures the hunter and blocks scent distribution.

It will be appreciated that the bottom edge 520 of the curtain 500 is disposed below the floor or platform on which the hunter stands and therefore, the cinching action causes a gathering of the curtain 500 underneath this standing platform.

In addition, the curtain 500 can contain a modified section that has elastic properties. For example, the curtain 500 can contain an elastic band that is formed below the top edge 510 thereof. The band permits the curtain 500 to stretch in a region proximate the top edge 510 and therefore, assists in folding the top edge over the rail parts 310, 320 and securing it to the curtain 500.

The curtain 500 can also be attached to the tree using supplemental securing techniques, including but not limited to using a cord that attaches at one end to a fastener (e.g., an EZ I-screw) that is secured to the tree. The other end of the cord attaches to the top edge 510 of the curtain 500.

In yet another embodiment, the cable 600 can include a housing in which the cable is wound and is biasedly contained therein. The housing has two slots or openings through which the two free ends 602, 604 of the cable 600 extend. Each end 602, 604 can be pulled from the housing by overcoming the force of the biasing member (e.g., a spring), thereby permitting the cable 600 to be routed along the curtain 500 in the manner described herein. In this embodiment, the cable and housing combination is similar to a wound tape measure.

In addition, the shooting rail parts 300 can include other features that provide comfort and a more pleasing environment to the hunter. For example, the shooting rail parts 300 can include one or more hooks provided along the length of the shooting rail parts 300 that permits the hunter to hang one more items along the shooting rail parts 300. For example, a hook like member can be provided along the rail parts 310, 320 to allow an item to be hung.

In yet another embodiment, the portable shooting rail 100 can be formed so that it has the ability to be transported along the ground to and from the tree in which the shooting rail 100 is installed. For example, the rear frame 200 can be converted into a rollable member that is capable of transversing the ground. Wheels or coaster type wheels can be provided and can be engaged with a portion of the rear frame 200 to permit the entire shooting rail 100 to be movable along the ground/outdoor terrain. For example, an underside of the base plate 210 of the shooting rail 100 can include a pair of connectors or bosses that extend outwardly therefrom and include a first locking member (e.g., a snap fit locking mechanism). A pair of wheel assemblies is provided for detachably being coupled to the pair of connectors. For example, each wheel assembly can include a wheel member and a post that extends outwardly therefrom. The post includes a second locking member that is complementary to the first locking member that is part of the connector. When the first and second locking members mate together, a secure, yet detachable connection, is formed between the wheel assembly and the rear frame 200. Since the wheel assemblies can be removed, the entire shooting rail 100 can be stored and transported easily.

It will also be appreciated that the wheel assemblies can be left in the attached position when the rear frame 200 is mounted to the tree since the locations of where the wheel assemblies are attached are spaced from the trunk of the tree.

This conversion creates a hand-truck like structure that can grasped by the user in order to move across the ground. The top of the rear frame 200 can act as a handle and therefore, can contain comfort padding or the like.

The forward arms 220, 230 of the rear frame 200 define a floor or base on which other components, items, etc., can be laid in order to carry these objects both to and from the tree. For example, the rail parts 310, 320 can be laid across the forward arms 220, 230. Any number of different techniques can be used to securely attach the rail parts 310, 320 to the fear frame 200 for purpose of carrying the parts to and from the tree. For example, straps formed of hook and loop material can be used to securely attach the rail parts 310, 320 to the rear frame 200.

In one embodiment, the distance between the ends of the forward arms 220, 230 is about 16 inches; however, other distances can be used so long as the distance between the arms 220, 230 accommodates the body of the user.

To couple the wheel assemblies to the rear frame, the post can include a biased protrusion or button that when aligned with an opening formed in the wall of the connector mates therewith resulting in the wheel assembly being snap-lockingly engaged.

It will also be appreciated that the post or shaft of the wheel assemblies can be telescoping posts that have an adjustable length thereof. This allows the user to vary the distance from the wheel to the base plate 210, thereby accommodating users of different heights, etc.

Now referring to FIGS. 3-6, the shooting rail 100 can be formed so that it has the ability to be transported along the ground to and from the tree in which the shooting rail 100 is installed. For example, the rear frame 200 can be converted into a rollable member that is capable of transversing the ground.

In the embodiment shown in FIGS. 3-6, a ladder structure 700 is provided as a base or frame for the transportable shooting rail assembly. The ladder structure 700 is formed of a first vertical member 710 and a second vertical member 720 with a space disposed therebetween. Between the first and second vertical members 710, 720, a plurality of horizontal support members (rungs) 730, 740 that are spaced apart from one another. The ladder structure 700 has a top end 705 and a bottom end 707. The top end 705 is located above the top rung 740, while the bottom end 707 is located below the bottom rung 730.

Proximate and below the bottom end 707, each vertical member 710, 720 include a coupling opening 760 (e.g., a through hole). The distance from each opening 760 to the bottom rung 750 is the same. The coupling openings 760 are designed to receive fasteners that couple the rear frame 200 to the ladder structure 700. For example, each of the arms forward support arms 220, 230 includes a complementary through opening 765. To couple the ladder structure 700 to the rear frame 200, the vertical members 710, 720 are disposed on the underside of the forward support arms 220, 230 with the coupling openings 760 aligning with the through openings 765. Fasteners, such as cotter pins or the like, are inserted into and through the aligned openings 760, 765 for securely attaching the ladder structure 700 to the rear frame 200.

In the attached state, the bottom end 707 lies proximate the ends of the rear support arms 240, 250 of the rear frame 200. In this embodiment, the ends of the rear support arms include coupling members, such as eye hooks, that extend outwardly from the bottom surface of the rear support arms. To covert the shooting rail into a transportable member, a wheel assembly 800 is provided and is removably attached to the rear frame 200. More specifically, the wheel assembly 800 includes a shaft 810 that has first and second ends 812, 814 that pass through the openings formed in the coupling members 780. Once again, the shaft 810 can be fixed and held in place using fasteners, such as cotter pins that limit the lateral movement of the shaft 810. The wheel assembly 800 includes a wheel 820 that rotates about the shaft 810.

The wheel assembly 800 can thus be easily attached between the two vertical members 710, 720 at the bottom end 707 thereof. The wheel 820 is sized such that when the attached rear frame 200 and ladder structure 700 are brought upright, the wheel 820 contacts the ground; however, the bottom end 707 of the ladder structure 700 and the rear frame 200 is elevated relative to the ground to permit the shooting rail to be transportable over the ground when it is converted into this transportable mode.

In this embodiment, the first shooting rail part 310 and the second shooting rail part 320 are designed to function as handles. One end of each of the first and second shooting rail parts 310, 320 are attached to the top ends of the vertical members 710, 720. The shooting rail parts 310, 320 thus represent curved handles that can be easily grasped by the user. For example, the top ends of the vertical members 710, 720 can be female parts that mate with the male parts of the rail parts 310, 320.

Figure 3:
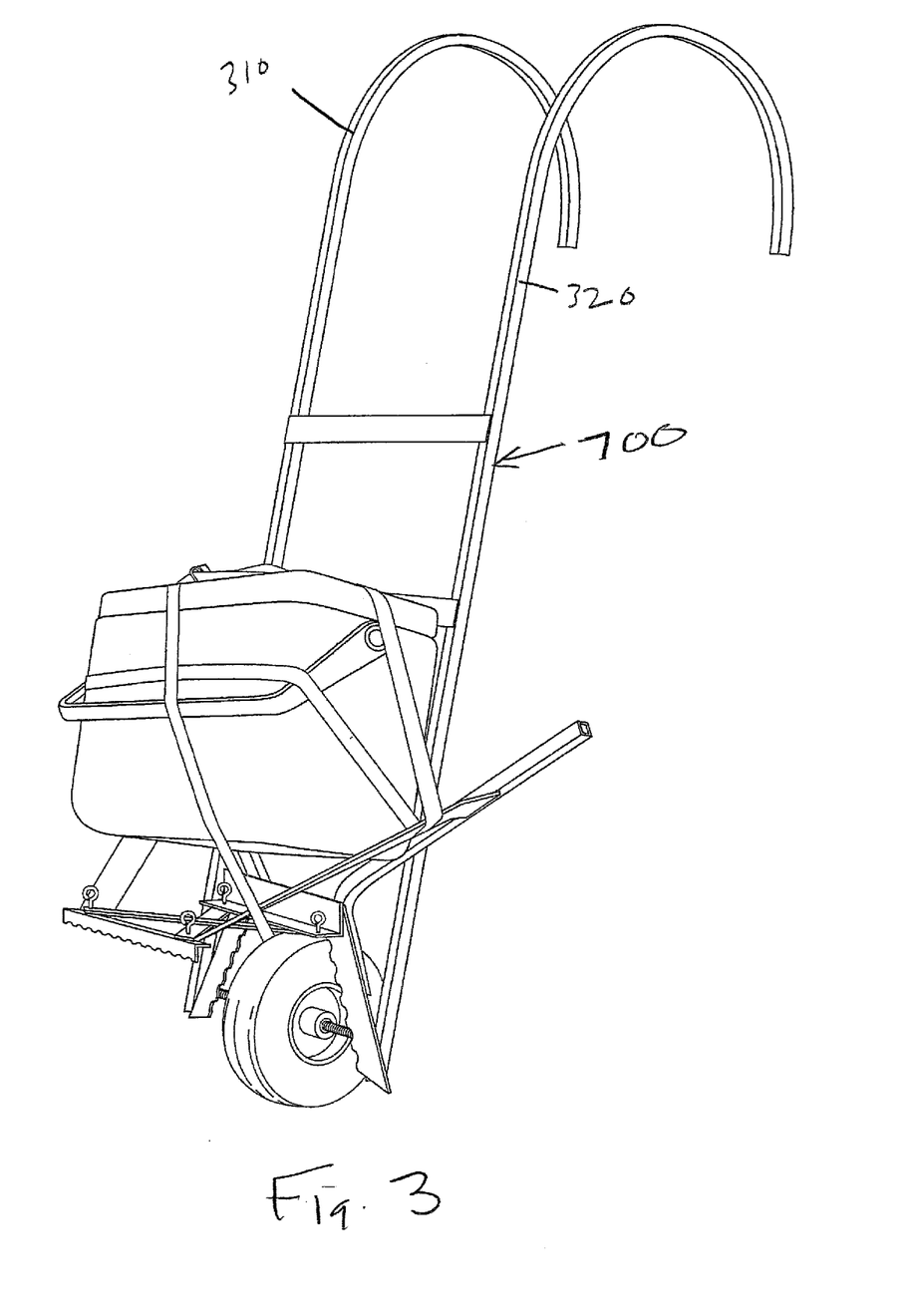
FIG. 3 is a perspective view of a portable shooting rail converted into a hand truck assembly according to one embodiment.
Figure 4:
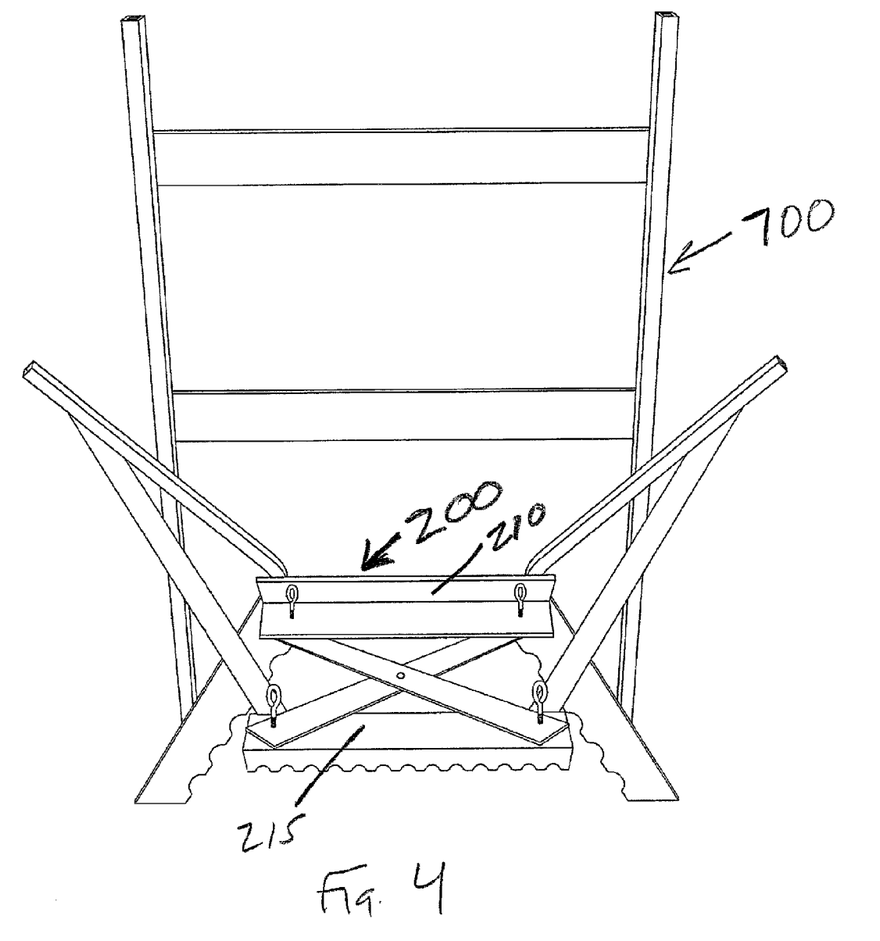
FIG. 4 is a front elevation view of a portable shooting rail of FIG. 3 without the wheel assembly.
Figure 5:
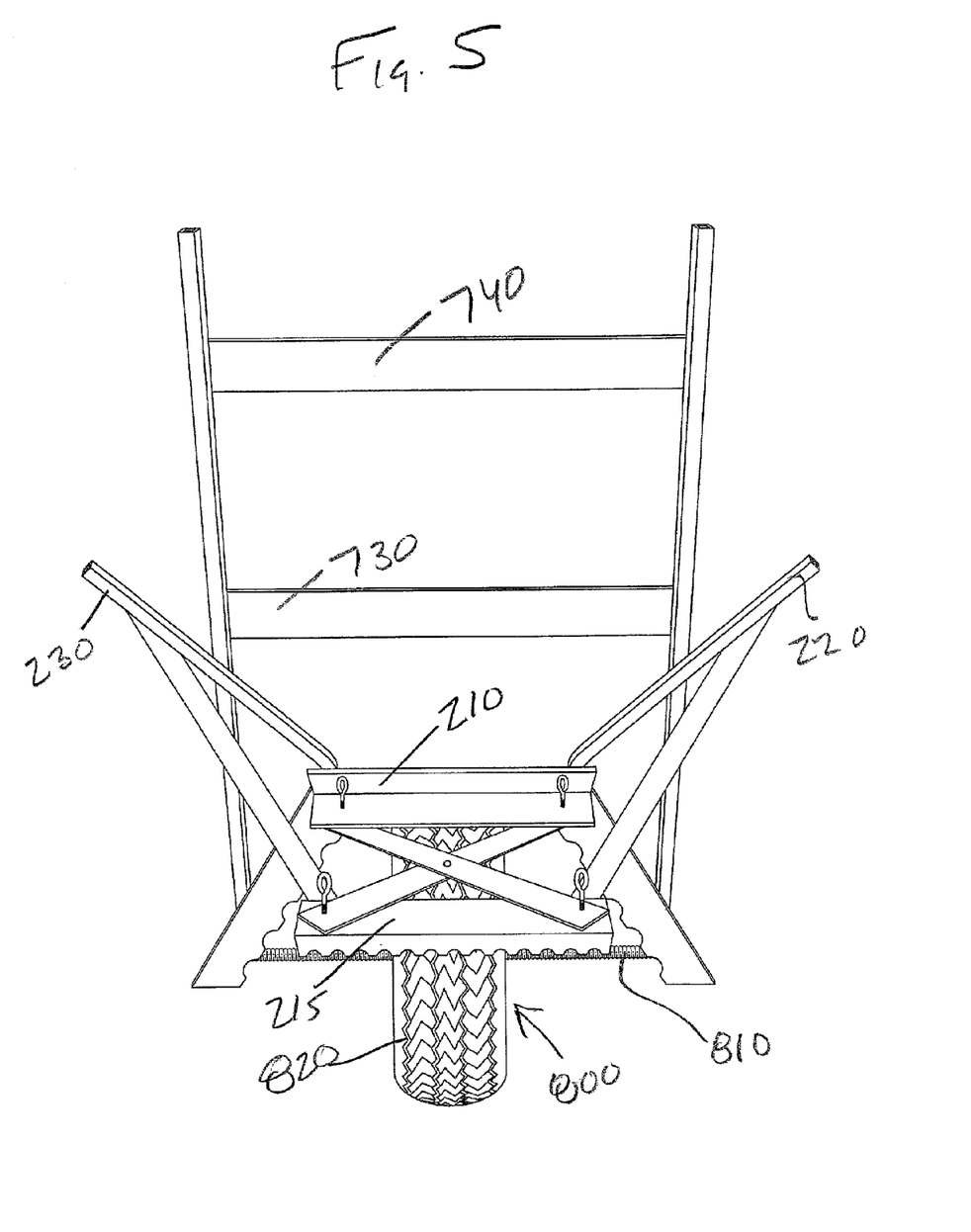
FIG. 5 is a front elevation view of the portable shooting rail with the wheel assembly.
Figure 6:
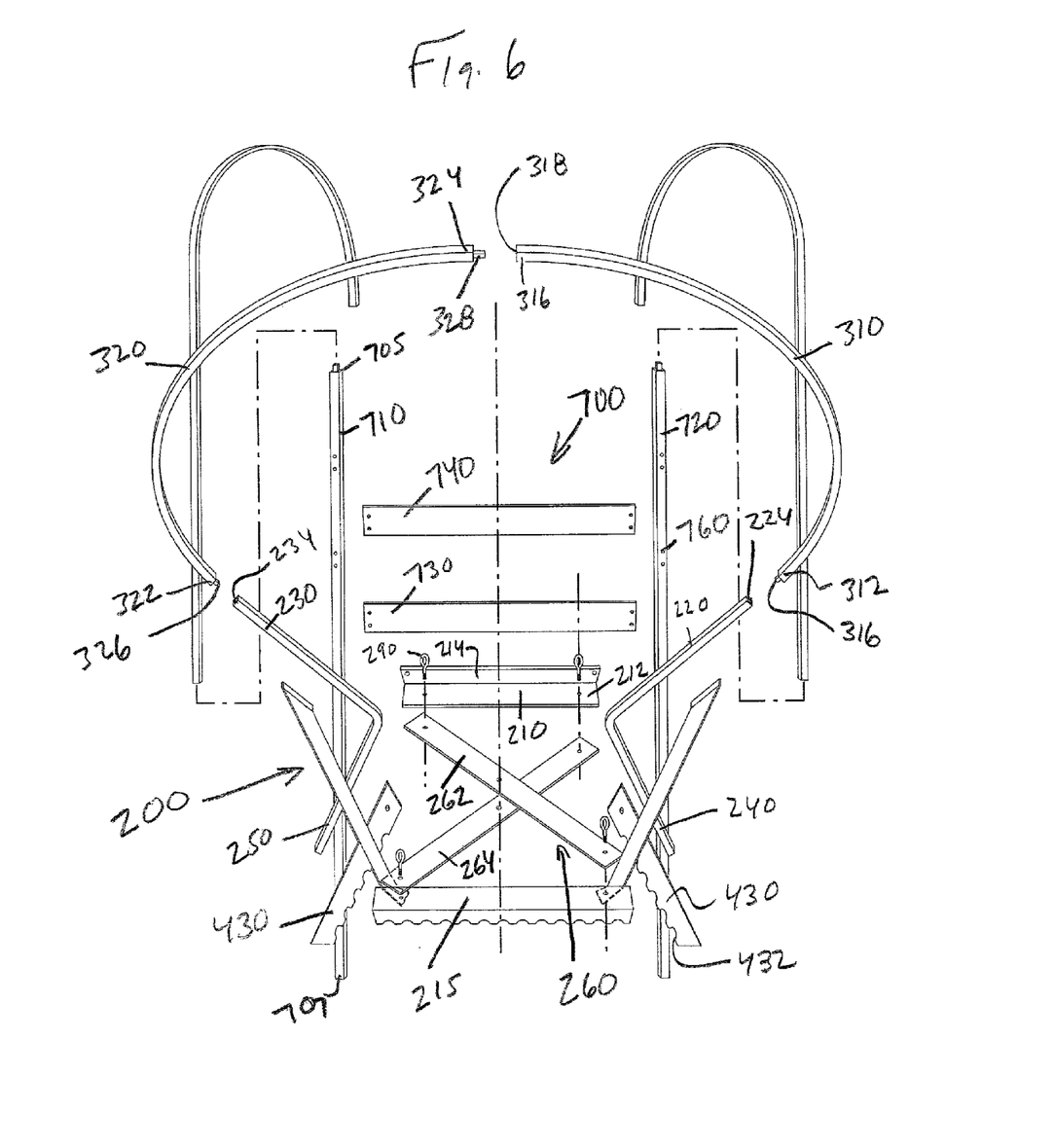
FIG. 6 is an exploded view of the components of the portable shooting rail of FIG. 4.

As shown in FIG. 3, an object, such as an animal carcass or a storage container (e.g., a cooler) can be held on the combined rear frame 200/ladder structure 700. The object can fit between the struts 260, 270. As shown in the Figures, straps or the like can be used to securely hold the object. Padding can be placed on the rail parts 310, 320 to allow the user to easily and comfortable grasp the portable/transportable shooting rail.

As shown in FIG. 1, one edge 217 of the second plate 215 of the rear frame 200 also includes teeth 219 since this edge 217 engages and contacts the trunk of the tree. The second plate 215 can have a length of about 12 inches. The length of the cross-members that forms the X cross-support can be about 12 inches.

The shooting rail 100 is constructed such that the rail parts 300 can sustain at least 15 pounds (lbs) of force without flexion or deformity.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A portable shooting rail for use with a tree stand comprising:
   a rear frame assembly for engaging a tree, the rear frame assembly having a pair of spaced rear arms for engaging a tree and a pair of spaced forward arms and a vertical support portion that extends upwardly from the arms for placement against the tree, the forward arms extending outwardly from the vertical support portion such that an obtuse angle is formed between the forward arms since a transverse distance between the forward arms continuously increases in a direction towards distal ends of the forward arms; and
   a rail structure that is detachably coupled to the rear frame, the rail structure including a first rigid arcuate rail part and a separate second rigid arcuate rail part that is detachably fit on the first arcuate rail part, the first rail part having a first end that is detachably coupled at a first point to the distal end of one forward arm and an opposing second end, the second rail part having a first end detachably coupled at a second point to the distal end of the other forward arm and an opposing second end that is coupled to the second end of the first rail part so are to form a complete rail structure that defines a shooting rail and defines an area in which the user can stand, wherein each of the first and second arcuate rail parts includes a fixed linear portion that terminates in the second end thereof and defines a forwardmost portion of the rail structure and a fixed arcuate portion that terminates in the first end, each arcuate portion of the respective arcuate rail part is curved outwardly to a first point at which the arcuate portion curves inwardly to the respective linear portion, wherein within the arcuate portions of the arcuate rail parts, a width of the assembled rail structure continuously increases in a direction from the first ends thereof to the first points thereof, the rail structure having a maximum width along an axis between the first points of the arcuate portions of the first and second arcuate rail parts and has decreasing width in direction from the first points to the linear portions of the first and second arcuate rail parts which define a forwardmost section of the rail structure.

2. The portable shooting rail of claim 1, wherein the rail structure parts are attached to the forward arms and one another without using an additional fastening component.

3. The portable shooting rail of claim 1, wherein the attachment between the rail parts and the rear frame and between the rail parts comprises a male/female frictional fit, thereby permitting easy detachment and attachment.

4. The portable shooting rail of claim 1, wherein each attachment joint between the rail parts and the rear frame and between the rail parts is defined by a male part and a female part.

5. The portable shooting rail of claim 1, wherein one forward arm and one rear arm are part of an integral unitary arm structure, the rear frame being formed of two unitary arm structures.

6. The portable shooting rail of claim 5, wherein the unitary structure has an arcuate shape and the greatest distance between the forward arm and the rear arm is defined between the a free distal end of the forward arm and a free distal end of the rear arm.

7. The portable shooting rail of claim 5, wherein the two unitary arm structures are arranged such that one is a mirror image of the other.

8. The portable shooting rail of claim 1, wherein a width of the rail structures at its greatest point is at least 45 inches.

9. The portable shooting rail of claim 1, further including a pair of wheel assemblies that are detachably coupled to the rear frame assembly so as to provide a cart structure that can support and carry objects, each wheel assembly including a post that is detachably coupled to the rear frame assembly and a wheel.

10. The portable shooting rail of claim 9, wherein the rear frame assembly is configured to form the cart that can travel along the ground, wherein a receiving base area of the cart is defined by the forward arms on which objects can be supported.

11. The portable rail of claim 1, wherein a camouflage structure is attached to the rail structure.

12. The portable rail of claim 11, the camouflage structure is a curtain that depends downwardly from the rail structure and blocks a view of a user standing therein.

13. The portable rail of claim 1, wherein the vertical support structure has a bottom cross bar and a top cross bar that is spaced from the bottom cross bar, the top cross bar and bottom cross bar being parallel to one another along their lengths, the vertical support structure further including a pair of separate cross support members that are in contact with one another in respective middle sections thereof and are connected at ends thereof to ends of both the top cross bar and the bottom cross bar respectively, the forward arms extending outwardly from the vertical support structure such that an obtuse angle is formed between the forward arms, wherein a pair of struts connect the bottom cross bar to the forward arms, wherein each of the top cross bar and the bottom cross bar comprises an L-shaped bracket defined by a vertical wall and a horizontal wall that intersects the vertical wall at a right angle, the horizontal wall of the top cross bar facing forward toward the rail structure, while the horizontal wall of the bottom cross bar faces rearward away from the rail structure, wherein first ends of the pair of cross support members are joined to a face of the vertical wall of the top cross bar that faces away from the rail structure and second ends of the pair of cross members are joined to a face of the vertical wall of the of the bottom cross bar that faces towards the rail structure.

14. A portable shooting rail for use with a tree stand comprising:
   a rear frame assembly for engaging a tree, the rear frame assembly having a pair of spaced rear arms for engaging a tree and a pair of spaced forward arms and a vertical support structure that extends outwardly from the arms for placement against the tree, the vertical support structure having a bottom cross bar and a top cross bar that is spaced from the bottom cross bar, the top cross bar and bottom cross bar being parallel to one another along their lengths, the vertical support structure further including a pair of separate cross support members that are in contact with one another in respective middle sections thereof and are connected at ends thereof to ends of both the top cross bar and the bottom cross bar respectively, the forward arms extending outwardly from the vertical support structure such that an obtuse angle is formed between the forward arms, wherein a pair of struts connect the bottom cross bar to the forward arms; and
   a rail structure that is detachably coupled to the rear frame, the rail structure being formed of separate rail sections that attach to one another and to the forward arms to define a completed loop.

15. The portable shooting rail of claim 14, further including:
   a camouflage curtain that includes a top edge having first fastener elements that permit the top edge to be folded over the shooting rail and securely attached thereto and a bottom edge having second fastener elements, the top edge having first cable routing members, the bottom edge having second cable routing members; and
   a cinching mechanism for gathering the bottom edge of the curtain, the mechanism including a cable having a first end and a second end, the cable being routed through first coupling routing members and second cable routing members with the two end being located along the top edge to permit the user to cinch the curtain by pulling the ends toward one another.

16. The portable shooting rail of claim 15, wherein the first fastener elements comprise a plurality of spaced straps located along and extending outwardly from the top edge and a band of hook and loop material extending transversely across the curtain, the straps including hook and loop material that mates with the band of hook and loop material to capture the shooting rail within the folded top edge of the curtain.

17. The portable shooting rail of claim 15, wherein the first and second coupling members comprise a plurality of rings that permit passage of the cable therethrough.

18. The portable shooting rail of claim 14, wherein each of the top cross bar and the bottom cross bar comprises an L-shaped bracket defined by a vertical wall and a horizontal wall that intersects the vertical wall at a right angle, the horizontal wall of the top cross bar facing forward toward the rail structure, while the horizontal wall of the bottom cross bar faces rearward away from the rail structure, wherein first ends of the pair of cross support members are joined to a face of the vertical wall of the top cross bar that faces away from the rail structure and second ends of the pair of cross members are joined to a face of the vertical wall of the of the bottom cross bar that faces towards the rail structure.

19. The portable shooting rail of claim 14, wherein each of the bottom cross bar and the top cross bar is made of solid material that straightens in a longitudinal direction.

20. The portable shooting rail of claim 14, wherein the shooting rail is turned upside down such that the bottom cross bar is placed at the top part of the rear frame and the shooting rail is located below the rear frame.

21. A portable and transportable shooting rail for use with a tree stand comprising:
   a rear frame assembly for engaging a tree, the rear frame assembly having a pair of spaced rear arms for engaging a tree and a pair of spaced forward arms, a pair of spaced rear arms and a vertical support portion that extends upwardly from the arms for placement against the tree along with the rear arms, the forward arms extending outwardly from the vertical support portion such that an obtuse angle is formed between the forward arms;
   a rail structure that is detachably coupled to the rear frame, the rail structure including a first rigid arcuate rail part and a separate second rigid arcuate rail part that is detachably fit on the first arcuate rail part, the first rail part having a first end that is detachably coupled at a first point to the distal end of one forward arm and an opposing second end, the second rail part having a first end detachably coupled at a second point to the distal end of the other forward arm and an opposing second end that is coupled to the second end of the first rail part so are to form a complete rail structure that defines a shooting rail and defines an area in which the user can stand, wherein each of the first and second arcuate rail parts includes a fixed linear portion that terminates in the second end thereof and defines a forwardmost portion of the rail structure and a fixed arcuate portion that terminates in the first end, each arcuate portion of the respective arcuate rail part is curved outwardly to a first point at which the arcuate portion curves inwardly to the respective linear portion wherein within the arcuate portions of the arcuate rail parts, a width of the assembled rail structure continuously increases in a direction from the first ends thereof to the first points thereof, the rail structure having a maximum width along an axis between the first points of the arcuate portions of the first and second arcuate rail parts and has decreasing width in direction from the first points to the linear portions of the first and second arcuate rail parts which define a forwardmost section of the rail structure; and a wheel assembly that is configured to be detachably coupled to the rear frame assembly, the wheel assembly including a frame that is securely coupled to the forward arms and includes a pair of vertical, parallel support members that have bottom ends, the wheel assembly having a rotatable wheel axle that is rotatably coupled to the rear arms of the rear frame assembly and a wheel that is rotatably coupled to the axle, the rail sections being configured to mate with top ends of the vertical, parallel support members so as to define a handle to grasp, wherein a diameter of the wheel is sized so that in an upright position, the wheel contacts the ground and the bottom ends of the support members and rear frame assembly are elevated relative to the ground.

22. The transportable shooting rail of claim 21, wherein the frame is in the form of a ladder structure that includes a plurality of rung members formed between the vertical support members and extending horizontally therebetween.

23. The transportable shooting rail of claim 21, wherein one forward arm and one rear arm are part of an integral unitary arm structure, the rear frame being formed of two unitary arm structures.

24. The portable shooting rail of claim 23, wherein the unitary structure has an arcuate shape and the greatest distance between the forward arm and the rear arm is defined between a free distal end of the forward arm and a free distal end of the rear arm.

* * * * *